United States Patent

Michelon

[15] 3,692,086
[45] Sept. 19, 1972

[54] METHOD OF MAKING A PRECISION CASTING LAYERED MOLD

[72] Inventor: Robert Michelon, Combes La Ville, France

[73] Assignee: U.C.P.I. S.A. R.L. Pour L'Utilisation des Ceramiques et des Platres dans L'Industrie, Nanterre, France

[22] Filed: Dec. 29, 1969

[21] Appl. No.: 888,315

[30] Foreign Application Priority Data

Dec. 27, 1968  France....................68181109
Dec. 2, 1969   France......................6941581

[52] U.S. Cl..................................................164/25
[51] Int. Cl.................................................B22c 9/12
[58] Field of Search..............................164/23, 24, 25

[56] References Cited

UNITED STATES PATENTS

| | | | |
|---|---|---|---|
| 2,945,273 | 7/1960 | Herzmark et al. | 614/24 X |
| 2,947,046 | 8/1960 | Wiedmann | 164/23 |
| 3,136,011 | 6/1964 | Peras | 164/23 X |
| 3,209,421 | 10/1965 | Shepherd | 164/25 X |

Primary Examiner—J. Spencer Overholser
Assistant Examiner—John E. Roethel
Attorney—Robert E. Burns and Emmanuel J. Lobato

[57] ABSTRACT

The disclosure relates to casting bodies usable in precision casting. These casting bodies are composed of a mixture of refractory materials of different granulometries, 2 to 600 microns for the fine grains and 250 to 6,000 microns for the coarse grains, the percentage of fine grains and coarse grains being comprised respectively between 20 and 77 percent and between 23 and 80 percent, and this mixture being bound with the aid of a binder obtained by gelation of a silicate.

1 Claim, 1 Drawing Figure

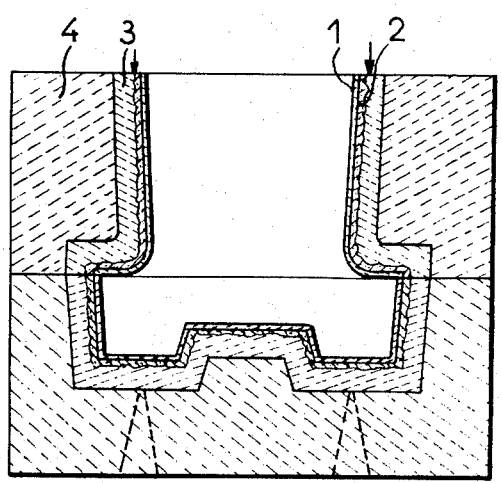

METHOD OF MAKING A PRECISION CASTING LAYERED MOLD

The present invention relates to molds and other casting bodies for precision casting, and to a method of manufacturing these molds and similar elements such as casting cores.

It relates more especially to a manufacturing process for refractory layered mold structure for precision casting on permanent patterns.

Various types of refractory molds for precision casting are known, more especially molds of ceramic material called "monobloc" molds effected in a refractory material, such as sillimanite for example, finely crushed, the cohesion of which is effected with the aid of a binder which results from the hydrolysis and gelation "in situ" of silicate of ethyl or of silicate of sodium.

However, such monobloc molds have a certain number of drawbacks, namely: the refractory molds in which one uses a binder obtained from silicate of ethyl, though they give cast parts the surface quality or "skin" of which is perfect, have a very high cost price by virtue of the very high cost price of the silicate of ethyl; their realization presents, moreover, risks of fire by virtue of the high inflammability of the silicate of ethyl; moreover, the stability of these molds in course of time is insufficient : they become friable and require the use of a frame.

The molds the cohesion of which is effected with the aid of a binder obtained from silicate of sodium, do not ensure an adequate surface quality, and, in addition, they are firable, which makes their handling difficult and necessitates the use of a frame. Moreover, they give rise to cast pieces the geometrical and dimensional precision of which is insufficient and the geometry and the dimensions of the pieces obtained are not constant from one piece to the other by virtue of the very variable deformations which these molds undergo.

As the finely crushed refractory material used for the realization of the monobloc molds for precision casting is itself also costly, it has been proposed to realize composite molds with a view to their use in precision casting. These composite molds are essentially constituted : (a) by a coating layer intended to form the pouring surface of the mould, and constituted by a pulverized refractory substance such as zircon, silicate of zirconium, alumina, silica or magnesia, the cohesion of which is ensured by a binder constituted by a gel of silica obtained by hydrolysis and gelation of a silicate of ethyl or of a silicate of sodium; (b) by a back-up layer realized in a refractory material having coarser grains bound with the aid of a silica gel obtained by hydrolysis and gelation of silicate of ethyl or of silicate of sodium, the two constituent elements of such a mold being advantageously clamped-together through the medium of a fixing layer of refractory material, having a large grain size, sanded on the refractory coating layer which constitutes the pouring surface of the mold. Such composite molds, though they have a lower cost price than that of the monobloc molds, have the same drawbacks as the monobloc molds.

Therefore it is an object of the invention to provide a method for manufacturing layered mold structure for precision casting which allow the obtention of cast pieces the geometry and the dimensions of which are constant, and of which the geometrical precision as well as the dimensional precision are perfect and reproducible, the precision casting molds and other casting bodies obtained in accordance with the present invention ensuring, moreover, a perfect surface quality of the cast pieces obtained.

The present invention will be better understood by the following description of several embodiments given by way of example and one of which is shown in the single figure of the drawing.

It must, however, be understood that this drawing and the corresponding descriptive parts do not have any restrictive character.

The layered mold structure realized according the method of the invention is of the permanent pattern type, this involves that it comprised at least two parts configured on a permanent pattern and glued together to form the whole mold structure. The method according to the invention comprises, for each part of the mold structure, the steps of (1) molding a back-up layer provided with filling channels on a permanent pattern, if necessary after interposition of a pre-form consisting of a material such as plaster, modelling paste, wood or any other suitable appropriate material, this back-up layer comprising a refractory material intermixed with a binder, the setting of the mixture being ensured in a chemical way thanks to the reaction of the constituent substances of the binder one with the other, (2) subjecting the back-up layer so obtained to a progressive cooking up to approximately 900° C., this latter, ready for use, being stored in appropriate hygrometric and thermal conditions, (3) coating the permanent pattern, bereft of pre-form and advantageously placed on a match-plate, with a coating layer intended to form the inner surface of the mold; by any appropriate means such as dipping, projection by spray-gun, etc., the setting of this layer being effected in a chemical way or the like, (4) proceeding to the sanding of the coating layer, for example by projection of an appropriate refractory material, (5) replacing the back-up layer on the so coated pattern, (6) pouring, with the aid of the pouring channels provided in the back-up layer, an intermediate layer between the back-up layer and coated pattern, (7) assembling the different parts of a mold, realized in the same manner, and proceeding to the glueing of these parts by means of a fire-proof glue and (8) subjecting the whole mold structure to a progressive cooking process up to about 800° C.

The embodiment of the layered mold structure obtained according to the invention is represented in the single FIGURE in the form of a mold, by way of example, which comprises a upper part and a lower part.

This mold comprises a contact or configured layer 1 of very slight thickness, of the order of several tenths of a millimeter, the composition of which is such that it ensures a fine "skin" to the moulded pieces and that it avoids a reaction between the metal poured into the mold and the material of the mold. One can vary the composition of this layer, more especially of the refractory materials which constitute it, as a function of the metals or alloys which have to be poured into the mold, so as to avoid the production of reactions disastrous to the cast piece; it is thus that by choosing suitably the refractory material of which the layer 1 is composed, one can avoid the reactions of decarbonization on the steel parts.

The refractory material used for this contact layer is constituted by vitreous silica or silico-aluminas, the grain size of which is comprised between 2 and 40 microns. The cohesion of this refractory material is ensured by the addition of a binder obtained by hydrolysis of silicate of ethyl having a content of $SiO_2$ higher than 30 percent.

The mold comprises moreover a sanding or formed layer 2 interposed between the contact layer 1 and an intermediate layer 3 of ceramic. This sanding layer 2, formed with the aid of a refractory material the granulometry of which is comprises between 100 and 150 microns has essentially the function of ensuring the bond between the layer 1 and the layer 3. The intermediate layer 3, which is constituted by a mixture of refractory materials of variable granulometries, comprised between 44 and 75 microns for the flours (fine grains) and between 250 and 1,000 microns for the degreasers (coarse grains) for example, and the coefficient of expansion of which is low, allows to reduce the thickness of the layer 1 the cost price of which is high, and to ensure the clamping of this same layer 1, such a clamping have the effect of improving considerably the dimensional and geometrical qualities of the cast pieces; its good permeability, due to its specific composition and to its specific granulometry, allows the evacuation of the gases from the contact layer towards the filling in excellent condition in the course of the casting of the pieces.

This intermediate layer comprises 43 to 61 percent of flours for 39 to 57 percent of degreasers, and the cohesion of this intermediate layer is ensured by the addition to the refractory mixture of a binder obtained by hydrolysis of silicate of ethyl having a content of $SiO_2$ higher than 30 percent.

This mold finally comprises a back-up layer 4 the composition of which is such that it lowers substantially the cost price of a mold of this type in relation to the cost prices of molds of known types, whilst allowing it to withstand comparatively high temperatures, which can reach 1,000° C., which permits the cooking of such a back-up layer prior to the casting of the intermediate layer 3 of ceramic and to the remolding of the back-up layer on the contact layer 1. The possibility of subjecting the back-up layer to a prior cooking process has the effect of improving very notably the dimensional and geometrical stability of the mold since in the course of such a cooking one realizes not only the dehydration of the back-up layer, but one also eliminates the residual water and in the course of such a prior cooking process the deformations or distorsions which the back-up layer can possibly undergo are produced without having repercussions on the whole of the mold.

The back-up layer comprises 20 to 30 percent of flours for 80 to 70 percent of degreasers. The cohesion of the refractory materials comprising the back-up layer is ensured by the addition of an alkaline silicate of sodium or potassium, the $SiO_2/Na_2O$ or $SiO_2/K_2O$ ratio being comprised between 3.2 and 3.9. The gelation of these alkaline silicates is effected by means of powdery silicon. As binder, a hydrolyzed silicate of ethyl having a content of $SiO_2$ higher than 30 percent can also be used.

The constitution of the back-up layer in accordance with the present invention confers, on the casting body realized, very interesting qualities of use by reason of its high stability and it great hardness, in particular in the perspective of the realization of large pieces (of 150 kg and more for example) : in fact, the said back-up layer withstands the ferrostatic pressures of the metal upon the casting, despite the absence of a frame. On the other hand, its high permeability allows the removal of heat in the course of casting operation, by implementing an appropriate device which has a great interest in the perspective where one is seeking a directed solidification of the cast metal, or if one is seeking to confer a fine structure on the cast alloy.

In the preferred embodiment of the invention, for a mold as illustrated in the single figure, the degreasers are aluminosilicates, particularly a mixture of $SiO_2$ and $Al_2O_3$ and the flours are silicates of zirconium $SiO_4Zr$ ($SiO_2ZrO_2$) of which must not be less than 67 percent. Moreover the degreasers and the flours contain very low quantities of different impurities which are indicated in the following table:

| Impurities | Degreasers % max. | Flours % max. |
|---|---|---|
| $Fe_2O_3$ | 0.75 | 0.01 |
| $TiO_2$ | 0.6 | 0.10 |
| CaO | 0.1 | 0.10 |
| MgO | 0.1 | 0.05 |
| $K_2O$ | 1.5–2 | 0.01 |
| $Na_2O$ | 0.1 | 0.02 |
| $Li_2O$ | — | 0.01 |

Other properties of the degreasers and the flours are given below.

| | Degreasers | Flours |
|---|---|---|
| Hardness (Moh's scale) | 8–9 | 7,5 |
| Total porosity | 6 % | — |
| Melting point | 1750–1800° | more than 2000°C |
| Coef. of reversible thermal expansion (from 20°C to 1000°C) | $4.44 \times 10^{-6}$ $-6 \times 10^{-6}$ | $4.5 \times 10^{-6}$ |

Furthermore the pyroscopic resistance of these degreasers and flours is very high.

One can also use as filling flour and even as degreaser, electromelted silicas, alone or in a mixture with the above degreasers or the above filling flours, or both at once; this use is recommended in the case where one desires to obtain a very large geometrical and dimensional stability. The silica employed has to contain 99.9 percent of $SiO_2$. Its coefficient of reversible thermal expansion is of the order of $0.54 \times 10^{-6}$ when it is taken from 20° to 1,000° C.

The granulometry of the degreasing grains and of the filling flour as well as their percentages in the mixture, vary according to whether this mixture is used to realize a mold or a core.

The percentage and the grain size of the degreasers and the flours used in both cases are given below:

| | | Mold | Core |
|---|---|---|---|
| Degreaser of round shape | Quantity grainsize | 20–30% 100–500μ | |
| Degreaser of angular shape | Quantity grain size | 24–40% 7500–4500μ | 39–57% 250–1000 μ |
| Filling flour | Quantity grain size | 27–57% 44–75μ | 43–61% 44–75μ |

The ceramics about which one has supplied the characteristics themselves in the shape of dry mixtures and to obtain pourable products, for the realization of molds, cores or the like, it is just necessary to bind them by chemical means.

The pourable products obtained in this way allow the obtention of very resistant casting bodies, which facilitates manipulation.

The molds obtained from the pourable product defined above are suitable, amongst other things, for the pouring of the light alloys of zinc, bronze, cast iron, steels, precious metals and some nuclear alloys.

It results from the aforegoing description that, whatever may be the methods of realization, of application and of implementation adopted, one obtains casting bodies, usable in precision casting, which have important advantages in relation to the casting bodies of the same type known previously.

As emerges from the aforegoing, the invention is not limited to the embodiments and applications which have just been described in detail but relates on the contrary to all variations remaining within the scope of the present invention, in particular the variation according to which certain of the constituents of the composite mould are absent to allow the solving of special manufacturing problems, it is thus that forming part of the scope of the invention are the composite moulds not comprising a contact layer or an intermediate layer in ceramic. The present invention also relates, of course, to the casting bodies having to have the special properties mentioned even if they have not been described as is the case of the casting ladles and of the moulding bodies relating to "lost wax" moulding.

I claim:

1. A method of manufacturing a precision casting layered mold structure of the permanent pattern type, comprising molding a layered mold structure comprising at least two parts, each part of which is made by molding a back-up layer having a mold cavity, the form of which corresponds to the permanent pattern, of ceramic refractory material, including coarse grains from about 2 to about 6mm and fine grains from about 0.2 to about 0.6mm, intermixed with a binder selected from the group consisting of gelated alkaline silicates and hydrolized silicate of ethyl, and progressively heating the back-up layer to 900° C. to set and bond the refractory material, forming a configured layer of pulverized refractory material consisting of a member selected from the group consisting of vitreous silica and silicoaluminas having a grain size of between about 2 to 40 microns intermixed with a binder of hydrolyzed silicate of ethyl and setting the formed configured refractory material layer, and building up on the configured layer a layer of refractory material having grain size of between about 100 to 150 microns, disposing the back-up layer of set ceramic refractory material about the configured layer and the formed layer with the configured layer disposed as an innermost layer and said within said mold cavity, forming between the back-up layer and said formed layer an intermediate layer of refractory material including coarse grains from about 250 to about 1,000 microns and fine grains from about 45 to about 75 microns, selected from the group consisting of silicates of zirconium and electromelted silicas, intermixed with a binder consisting of a hydrolyzed silicate of ethyl, glueing together the different parts so obtained to form a unitary layered mold structure and heating the entire unitary layered mold structure progressively to about 800° C., and bonding the refractory of last-mentioned layer and the last-mentioned layer to said back-up layer and said formed layer.

* * * * *